(12) United States Patent
Iwasaki et al.

(10) Patent No.: US 11,891,701 B2
(45) Date of Patent: Feb. 6, 2024

(54) SPRAYING MATERIAL, SPRAYING SLURRY, PREPARING METHOD OF SPRAYING MATERIAL, FORMING METHOD OF SPRAYED COATING, SPRAYED COATING, AND SPRAYED MEMBER

(71) Applicant: Shin-Etsu Chemical Co., Ltd., Tokyo (JP)

(72) Inventors: Ryo Iwasaki, Echizen (JP); Noriaki Hamaya, Echizen (JP); Toshihiko Tsukatani, Echizen (JP); Yugo Taniguchi, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 16/842,945

(22) Filed: Apr. 8, 2020

(65) Prior Publication Data
US 2020/0325570 A1    Oct. 15, 2020

(30) Foreign Application Priority Data

Apr. 12, 2019  (JP) .................................. 2019-076099

(51) Int. Cl.
  *C23C 4/11*  (2016.01)
  *C23C 4/18*  (2006.01)
  *C23C 4/134*  (2016.01)
  *C04B 35/505*  (2006.01)
  (Continued)

(52) U.S. Cl.
  CPC ................ *C23C 4/11* (2016.01); *C04B 35/01* (2013.01); *C04B 35/10* (2013.01); *C04B 35/505* (2013.01); *C23C 4/134* (2016.01); *C23C 4/18* (2013.01)

(58) Field of Classification Search
  CPC .............................. C04B 35/505; C04B 41/45
  See application file for complete search history.

(56) References Cited

U.S. PATENT DOCUMENTS

2001/0003271 A1*  6/2001  Otsuki .............. C23C 16/45561
                                                156/914
2002/0018902 A1*  2/2002  Tsukatani .................. C23C 4/11
                                                428/469
(Continued)

FOREIGN PATENT DOCUMENTS

| JP | 2001-158620 A | 6/2001 |
| JP | 2001226773 A | 8/2001 |
| JP | 2003-63883 A | 3/2003 |

OTHER PUBLICATIONS

Wildfire, C.; Sabolsky, E.; Spencer, M.; Shekhawat, D.; "Solid-state Synthesis of YAG Powders Through Microwave Coupling of Oxide/Carbon Particulate Mixtures", Ceramics International, 2017, vol. 43, p. 11455-11462.*

(Continued)

*Primary Examiner* — Mark Ruthkosky
*Assistant Examiner* — Julia L Rummel
(74) *Attorney, Agent, or Firm* — WHDA, LLP (57) ABSTRACT

A spraying material comprising a rare earth (R), aluminum and oxygen, the spraying material being a powder and comprising a crystalline phase of a rare earth (R) aluminum monoclinic ($R_4Al_2O_9$) and a crystalline phase of a rare earth oxide ($R_2O_3$), with respect to diffraction peaks detected within a diffraction angle 2θ range from 10° to 70° by a X-ray diffraction method using the characteristic X-ray of Cu-Kα, the spraying material having diffraction peaks attributed to the rare earth oxide ($R_2O_3$) and diffraction peaks attributed to the rare earth (R) aluminum monoclinic ($R_4Al_2O_9$), and an intensity ratio I(R)/I(RAL) of an integral intensity I(R) of the maximum diffraction peak attributed to the rare earth oxide ($R_2O_3$) to an integral intensity I(RAL) of the maximum diffraction peak attributed to the rare earth aluminum monoclinic ($R_4Al_2O_9$) being at least 1.

10 Claims, 2 Drawing Sheets

(51) Int. Cl.
*C04B 35/10* (2006.01)
*C04B 35/01* (2006.01)

(56) References Cited

U.S. PATENT DOCUMENTS

| 2003/0049500 | A1* | 3/2003 | Takai | C23C 30/00 |
| | | | | 428/702 |
| 2010/0003271 | A1 | 1/2010 | Stepkowski | |
| 2013/0216821 | A1* | 8/2013 | Sun | C04B 41/5045 |
| | | | | 428/318.6 |
| 2015/0321964 | A1* | 11/2015 | Sun | C04B 35/5156 |
| | | | | 427/446 |
| 2017/0283933 | A1* | 10/2017 | Ibe | C23C 4/129 |

OTHER PUBLICATIONS

Ikhwan, M.; Aziz, R.; Hashim, M.; Holland, D.; Zulkimi, M.; Zakaria, A.; Hassan, J.; "Yttrium Aluminum Monoloclinic (YAM) Synthesized by High Energy Ball Milling, Impact: International Journal of Applied Research in Applied, Natural and Social Sciences" 2014, vol. 1, p. 85-90.*

Nakajima, K.; Dahl, S.; Thron, A.; Castro, R.; "Thermodynamic and Kinetic Analysews of Sintering in Al-doped Y2O3 Nanoparticles", 2022, vol. 105, p. 147-158.*

Triple/S Dynamics "Glossary of Terms", 2013, p. 1-2, Accessed at The Wayback Machine—https://web.archive.org/web/20130827153232/http://www.sssdynamics.com:80/resources/glossary-of-terms.*

Office Action dated Jan. 31, 2023, issued in counterpart Japanese application No. 2020-067359 (5 pages).

English machine translation of Office Action dated Jan. 31, 2023, issued in counterpart Japanese application No. 2020-067359 (5 pages).

English Translation of JP2001-158620A (Previously filed in IDS dated Feb. 15, 2023); Cited in TW Office Action dated Jun. 16, 2023. (12 pages).

Office Action dated Jun. 16, 2023, issued in counterpart to TW Application No. 109112123, with English Translation. (25 pages).

* cited by examiner

SPRAYING MATERIAL, SPRAYING SLURRY, PREPARING METHOD OF SPRAYING MATERIAL, FORMING METHOD OF SPRAYED COATING, SPRAYED COATING, AND SPRAYED MEMBER

CROSS-REFERENCE TO RELATED APPLICATION

This non-provisional application claims priority under 35 U.S.C. § 119(a) on Patent Application No. 2019-076099 filed in Japan on Apr. 12, 2019, the entire contents of which are hereby incorporated by reference.

TECHNICAL FIELD

This invention relates to a sprayed coating suitable for use as parts or members in a plasma etching apparatus which is employed in a semiconductor manufacturing process, and a forming method of a sprayed coating, a spraying material or a spraying slurry used in the forming of a sprayed coating, and a method of preparing a spraying material. This invention relates also to a sprayed member suitable for use in a plasma etching apparatus which is employed in a semiconductor manufacturing process.

BACKGROUND ART

In a plasma etching apparatus used in a semiconductor manufacturing process, a wafer to be processed is treated in a highly corrosive plasma atmosphere of a halogen-based gas such as a fluorine-based gas or a chlorine-based gas. Typically, fluorine-based gases such as $SF_6$, $CF_4$, $CHF_3$, $ClF_3$, HF and $NF_3$, and chlorine-based gases such as $Cl_2$, $BCl_3$, HCl, $CCl_4$ and $SiCl_4$ are used as the gases.

In a manufacturing of parts and members of a plasma etching apparatus exposed to a highly corrosive gas plasma atmosphere, generally, a corrosion-resistant sprayed coating is formed on the surface of a substrate by an atmospheric plasma spraying (APS) method in which a source material such as a rare earth compound is supplied in powder form, or a suspension plasma spraying (SPS) method in which a source material dispersed in a dispersion medium is supplied in slurry form. As the rare earth compound, yttrium oxide, yttrium fluoride, yttrium oxyfluoride, and yttrium aluminum garnet are exemplified.

In sprayed coatings of the rare earth compound, yttrium oxide having a good corrosion-resistant to corrosive halogen-based gas plasma is superior in plasma etching resistance, however, a sprayed coating of the yttrium oxide has a problem such that it has a large amount of yttrium-based particles. It is considered that yttrium fluoride-based coating is superior in plasma resistance, however, has a comparably low coating hardness and is inferior in plasma etching resistance. Further, a yttrium aluminum garnet coating has advantages in a small amount of rare earth particles and a high coating hardness, however, has insufficient corrosion resistance and is inferior in plasma etching resistance.

Meanwhile, JP-A 2003-63883 (Patent Document 1) proposes a member including a substrate and a mixed phase of a rare earth aluminum monoclinic phase, as a main phase, and at least one phase selected from the group consisting of a rare earth aluminum perovskite, a rare earth aluminum garnet and a rare earth oxide, as a sub phase laminated thereon. However, it has room to be improved, particular, in a viewpoint of corrosion resistance.

CITATION LIST

Patent Document 1: JP-A 2003-63883 (US 2003/0049500 A1)

DISCLOSURE OF INVENTION

For a corrosion-resistant sprayed coating used in parts or members in a plasma etching apparatus, a plasma resistant coating such as an yttrium oxide sprayed coating, an yttrium fluoride sprayed coating and an yttrium aluminum garnet coating was conventionally used. However, the conventional coating has a problem of insufficient plasma etching resistance since the conventional coating generates a large amount of yttrium-based particles by a reaction with corrosive halogen-based gas plasma, and has low hardness or low corrosion resistance.

An object of the invention is to provide a sprayed coating having high corrosion resistance used for parts or members in a plasma etching apparatus and having superior plasma etching resistance with reduced amount of particles generated by a reaction with halogen-based gas plasma, and a forming method of the sprayed coating. Another object of the invention is to provide a spraying material or a spraying slurry, and a preparing method thereof that is formable such a sprayed coating, and a sprayed member including such a sprayed coating.

The inventors have found a powdery spraying material containing a rare earth (R), aluminum and oxygen, including a crystalline phase of a rare earth (R) aluminum monoclinic ($R_4Al_2O_9$) and a crystalline phase of a rare earth oxide ($R_2O_3$), and having a prescribed structure and prescribed properties The spraying material can form a sprayed coating having high corrosion resistance and superior plasma etching resistance with reduced amount of particles generated by a reaction with halogen-based gas plasma. Further, the inventors have found the spraying material or a spraying slurry including the spraying material can be suitably prepared by the steps of forming a slurry by dispersing an aluminum oxide in an aqueous solution of a rare earth salt; crystalizing a precursor containing the rare earth and aluminum, as a precipitate, by adding a precipitant to the slurry; collecting the precipitate by a solid-liquid separation; and firing the precursor containing the rare earth and aluminum under an oxygen-containing gas atmosphere.

Moreover, the inventors found that a sprayed coating including a composite oxide containing the rare earth and aluminum can be formed by a thermal spraying, particularly, a plasma spraying with the spraying material or spraying slurry; particularly, the sprayed coating formed by using the spraying material or spraying slurry contains a rare earth (R), aluminum and oxygen, and includes a crystalline phase of the composite oxide containing the rare earth and aluminum, having a rare earth-rich composition compared to the stoichiometric composition of rare earth aluminum monoclinic ($R_4Al_2O_9$), and having a structure such that Al atom sites in the rare earth aluminum monoclinic ($R_4Al_2O_9$) are partially substituted with the rare earth (R) atoms. The sprayed coating has high corrosion resistance and superior plasma etching resistance with reduced amount of particles generated by a reaction with halogen-based gas plasma. Further, the inventors found that a sprayed member in which the sprayed coating is formed directly or via an underlaying coating on a substrate is excellent for parts or members in a plasma etching apparatus.

In first aspect, the invention provides a spraying material containing a rare earth (R), aluminum and oxygen, the spraying material being a powder and including a crystalline phase of a rare earth (R) aluminum monoclinic ($R_4Al_2O_9$) and a crystalline phase of a rare earth oxide ($R_2O_3$), wherein with respect to diffraction peaks detected within a diffraction angle 2θ range from 10° to 70° by a X-ray diffraction method using the characteristic X-ray of Cu-Kα, the spraying material has diffraction peaks attributed to the rare earth oxide ($R_2O_3$) and diffraction peaks attributed to the rare earth (R) aluminum monoclinic ($R_4Al_2O_9$), and an intensity ratio I(R)/I(RAL) of an integral intensity I(R) of the maximum diffraction peak attributed to the rare earth oxide ($R_2O_3$) to an integral intensity I(RAL) of the maximum diffraction peak attributed to the rare earth aluminum monoclinic ($R_4Al_2O_9$) is at least 1.

Preferably, the spraying material has a BET specific surface area S of at least 1 $m^2/g$, and a bulk density ρ of up to 2 $g/cm^3$. Particularly, the spraying material has a value S/ρ of 1 to 4, the value S/ρ being obtained by dividing the BET specific surface area S by the bulk density ρ.

Preferably, the spraying material has a composition corresponding to a relative rare earth oxide ($R_2O_3$) content of 75 to 99 wt % and a relative aluminum oxide ($Al_2O_3$) content of 1 to 25 wt % in the total content of the rare earth oxide ($R_2O_3$) and the aluminum oxide ($Al_2O_3$), the rare earth oxide ($R_2O_3$) content and the aluminum oxide ($Al_2O_3$) content being, respectively, calculated from the basis of an rare earth (R) content and an aluminum content in the spraying material.

Preferably, the rare earth (R) in the spraying material is selected from the group consisting of yttrium (Y), gadolinium (Gd), terbium (Tb), dysprosium (Dy), holmium (Ho), erbium (Er), thulium (Tm), ytterbium (Yb), and lutetium (Lu).

Preferably, the spraying material the spraying material has an average particle size D50 of 1 to 50 μm.

In second aspect, the invention provides a spraying slurry including the spraying material, and a dispersion medium, wherein a content of the spraying material in the spraying slurry is 10 to 70 wt %.

Preferably, the dispersion medium is an aqueous dispersion medium.

Preferably, the spraying slurry includes a dispersing agent.

Preferably, the spraying slurry has a viscosity of less than 15 mPa·s.

In third aspect, the invention provides a method of preparing a spraying slurry including the steps of:

forming a slurry by dispersing an aluminum oxide in an aqueous solution of a rare earth salt;

crystalizing a precursor containing the rare earth and aluminum, as a precipitate, by adding a precipitant to the slurry;

collecting the precipitate by a solid-liquid separation; and firing the precursor containing the rare earth and aluminum under an oxygen-containing gas atmosphere.

In fourth aspect, the invention provides a method of forming a sprayed coating including the step of:

forming the sprayed coating including a composite oxide containing a rare earth and aluminum, directly or via an underlaying coating on a substrate by plasma spraying with using the spray material or the spraying slurry.

In fifth aspect, the invention provides a sprayed coating containing a rare earth (R), aluminum and oxygen, the sprayed coating including a crystalline phase of a composite oxide containing the rare earth (R) and aluminum, wherein the crystalline phase of a composite oxide includes a crystalline phase of a composite oxide having a rare earth-rich composition compared to the stoichiometric composition of rare earth aluminum monoclinic ($R_4Al_2O_9$), and having a structure such that Al atom sites in the rare earth aluminum monoclinic ($R_4Al_2O_9$) are partially substituted with the rare earth (R) atoms.

Preferably, the sprayed coating includes a crystalline phase of a rare earth oxide ($R_2O_3$).

Preferably, the sprayed coating includes at least one crystalline phase selected from the group consisting of a rare earth aluminum monoclinic ($R_4Al_2O_9$), a rare earth aluminum perovskite ($RAlO_3$), and a rare earth aluminum garnet ($R_3Al_5O_{12}$).

Preferably, the sprayed coating has a composition corresponding to a relative rare earth oxide ($R_2O_3$) content of 75 to 99 wt % and a relative aluminum oxide ($Al_2O_3$) content of 1 to 25 wt % in the total content of the rare earth oxide ($R_2O_3$) and the aluminum oxide ($Al_2O_3$), the rare earth oxide ($R_2O_3$) content and the aluminum oxide ($Al_2O_3$) content being, respectively, calculated from the basis of an rare earth (R) content and an aluminum content in the sprayed coating.

Preferably, the rare earth (R) in the sprayed coating is selected from the group consisting of yttrium (Y), gadolinium (Gd), terbium (Tb), dysprosium (Dy), holmium (Ho), erbium (Er), thulium (Tm), ytterbium (Yb), and lutetium (Lu).

Preferably, the sprayed coating has a surface roughness Ra of up to 8 μm, a thickness of 10 to 500 μm, a Vickers hardness HV0.3 of at least 600, and/or a porosity of up to 5%.

In sixth aspect, the invention provides a sprayed member including the sprayed coating formed directly or via an underlaying coating on a substrate.

Advantageous Effects of Invention

According to the invention, a sprayed coating having superior plasma etching resistance and high corrosion resistance with reduced amount of particles generated by a reaction with halogen-based gas plasma can be formed. The sprayed coating is excellent as a sprayed coating formed in parts or members of a plasma etching apparatus which is employed in a semiconductor manufacturing process.

DESCRIPTION OF PREFERRED EMBODIMENTS

A spraying material of the invention is suitable for forming, typically by thermal spraying such as plasma spraying, a sprayed coating (a thermal sprayed coating) as parts or members in a plasma etching apparatus which is employed in a semiconductor manufacturing process. The spraying material of the invention preferably contains a rare earth (R), aluminum and oxygen, and includes a crystalline phase of a composite oxide containing a rare earth (R), aluminum, and, more preferably, includes a crystalline phase of a rare earth (R) aluminum monoclinic ($R_4Al_2O_9$) and a crystalline phase of a rare earth oxide ($R_2O_3$). The spraying material of the invention is normally powdery (particulate). The spraying material of the invention can form a sprayed coating having superior plasma etching resistance (corrosion resistance)

with reduced amount of rare earth particles caused by corrosive halogen-based gas plasma.

With respect to diffraction peaks detected within a diffraction angle 2θ range from 10° to 70° by a X-ray diffraction method using the characteristic X-ray of Cu-Kα, the spraying material of the invention may have diffraction peaks attributed to the rare earth oxide ($R_2O_3$) and diffraction peaks attributed to the rare earth (R) aluminum monoclinic ($R_4Al_2O_9$), and an intensity ratio I(R)/I(RAL) of an integral intensity I(R) of the maximum diffraction peak attributed to the rare earth oxide ($R_2O_3$) to an integral intensity I(RAL) of the maximum diffraction peak attributed to the rare earth aluminum monoclinic ($R_4Al_2O_9$) is preferably at least 1, more preferably at least 1.1. An upper limit of the intensity ratio I(R)/I(RAL) is normally up to 45. The integral intensity may be obtained by integrating intensities in the peak (integrating within the peak area) from the resulting XRD profile (diffraction intensity profile). In case that, for example, the rare earth aluminum monoclinic ($R_4Al_2O_9$) is yttrium aluminum monoclinic ($Y_4Al_2O_9$), the maximum peak is generally a diffraction peak attributed to the (−122) plane of the crystalline lattice, however, not limited thereto. The diffraction peak is normally detected at around 2θ=29.6°. In case that, for example, the rare earth oxide ($R_2O_3$) is cubic yttrium oxide ($Y_2O_3$), the maximum peak is generally a diffraction peak attributed to the (222) plane of the crystalline lattice, however, not limited thereto. The diffraction peak is normally detected at around 2θ=29.2°.

The spraying material of the invention preferably has a specific surface area S of preferably at least 1 $m^2/g$. The specific surface area S may be measured by BET method. The specific surface area S is more preferably at least 1.1 $m^2/g$. When a spraying material has a larger specific surface area, heat of a frame readily reaches into the inside of the particles during plasma spraying. Thus, when melted particles collide with a substrate or a coating on a substrate and splats are formed, the resulting coating tends to be dense, and the splats are tightly bonded. An upper limit of the specific surface area S is preferably up to 3.5 $m^2/g$, more preferably up to 3 $m^2/g$, however, not limited thereto. A spraying material having a small specific surface area is possible to reduce fine particles that adhere to the surface portion of the formed coating without entering to a thermal spray frame and cause particle contamination, and fine particles that are vapored due to excessive heat input through a thermal spray frame.

The spraying material of the invention preferably has a bulk density ρ of up to 2 $g/cm^3$. In the invention, an aerated bulk density may be adopted to the bulk density ρ. The bulk density ρ is more preferably up to 1.8 $g/cm^3$. A spraying material having a low bulk density can form a sprayed coating having a high hardness, since permeability of flame heat per unit particles is improved when the spraying material is used in plasma spraying. A lower limit of the bulk density ρ is preferably at least 0.4 $g/cm^3$, more preferably at least 0.5 $g/cm^3$, however, not limited thereto. When the spraying material has a high density, splats are is easy to be formed from the spraying material to during plasma spraying and a dense coating is easy to be formed. Further, it can reduce risk in degradation of properties of the resulting sprayed coating, since the particle has less gas component included in void of the particle.

The spraying material of the invention preferably has a value S/ρ of 1 to 4. The value S/ρ is obtained by dividing the specific surface area S ($m^2/g$) by the bulk density ρ ($g/cm^3$). A large value S/ρ means that the specific surface area S is too large and the bulk density is too small. Therefore, when the value S/ρ is more than 4, particles that will cause particle contamination, and particles that will easily form splats formable a coarse coating may be increased. On the other hand, a small value S/ρ means that the specific surface area S is too small and the bulk density is too large. Therefore, when the value S/ρ is less than 1, particles that will form a coarse coating due to increase of unmelted portions, and particles that will lower hardness of the resulting coating due to poor heat permeability may be increased. The value S/ρ is more preferably at least 1.2, even more preferably at least 1.5, and more preferably up to 3.8, even more preferably up to 3.5.

When the rare earth oxide ($R_2O_3$) content and the aluminum oxide ($Al_2O_3$) content are, respectively, calculated from the basis of an rare earth (R) content and an aluminum content in the spraying material, the spraying material of the invention preferably has a composition corresponding to a relative rare earth oxide ($R_2O_3$) content of 75 to 99 wt % and a relative aluminum oxide ($Al_2O_3$) content of 1 to 25 wt % in the total content of the rare earth oxide ($R_2O_3$) and the aluminum oxide ($Al_2O_3$). The relative content calculated as the rare earth oxide ($R_2O_3$) content is more preferably at least 80 wt %, even more preferably at least 85 wt %, and more preferably up to 97 wt %, even more preferably up to 95 wt %. On the other hand, the relative content calculated as the aluminum oxide ($Al_2O_3$) is more preferably at least 3 wt %, even more preferably at least 5 wt %, and more preferably up to 20 wt %, even more preferably up to 15 wt %.

In the spraying material of the invention, the total weight of main oxide component (a composite oxide containing a rare earth and aluminum, and a rare earth oxide (in case of two species), or a composite oxide containing a rare earth and aluminum, a rare earth oxide, and an aluminum oxide (in case of three species in which the aluminum oxide is further included) is assumed as the total weight of the relative content of the rare earth oxide and the relative content of the aluminum oxide. Further, a weight of $R_2O_3$ as basic composition of a rare earth oxide and a weight of $Al_2O_3$ as basic composition of aluminum oxide that are converted from a rare earth content and an aluminum content in the spraying material are assumed as the relative contents of the rare earth oxide and the aluminum oxide, respectively. A total content of oxides other than the main oxide content is preferably up to 3 wt %, more preferably up to 1 wt % in the spraying material. Most preferably, the spraying material is substantively free of the oxides except to the main oxide content, i.e., the spraying material substantively consists of the two species or three species constituting the main oxide component, however not limited thereto. The contents of the rare earth and aluminum in the spraying material can be measured by, for example, ICP emission optical spectroscopy, fluorescence X-ray analysis, or the like. Since rare earth and aluminum constituting the main oxide component can be selectively measured, fluorescence X-ray analysis is preferable.

The rare earth (R) in the spraying material of the invention includes at least one element selected from the group consisting of yttrium (Y) and lanthanoids from lanthanum (La) to lutetium (Lu) that have atomic numbers from 57 to 71, respectively. The rare earth (R) is preferably selected from the group consisting of yttrium (Y), gadolinium (Gd), terbium (Tb), dysprosium (Dy), holmium (Ho), erbium (Er), thulium (Tm), ytterbium (Yb), and lutetium (Lu), more preferably selected from the group consisting of yttrium (Y), gadolinium (Gd), dysprosium (Dy), erbium (Er), and ytterbium (Yb). The rare earth (R) may be used as single element or a combination of two or more elements.

The spraying material of the invention preferably has an average particle size D50 of up to 50 µm. The average particle size D50 designates a cumulative 50% diameter (or median diameter) in a volume basis particle size distribution. Particles of the spraying material having a small particles size form splats having a small diameter when the particles collide with a substrate or a coating on a substrate, thereby a porosity of the formed sprayed coating becomes low, and crucks generated in the splats are controlled. The average particle diameter D50 is more preferably up to 45 µm, even more preferably up to 40 µm. On the other hand, the spraying material of the invention preferably has an average particle size D50 of at least 1 µm. Particles of the spraying material having a large particles size has a large momentum, thereby the particles are easy to form splats when the particles collide with a substrate or a coating on a substrate. The average particle diameter D50 is more preferably at least 1.2 µm, even more preferably at least 1.5 µm.

The particles of the spraying material of the invention may be used as a spraying material in slurry form (a spraying slurry for thermal spraying) that includes particles of the spraying material dispersed in a dispersion medium. A content of the spraying material particles in the whole of the spraying slurry is preferably up to 70 wt %. If the content of the thermal spraying material exceeds 70 wt %, the slurry may become blocked in a supply device during thermal spraying, thus a sprayed coating cannot be formed. When the content of the spraying material particles in the spraying slurry is low, particles actively move in flow of the slurry, and dispersibility is improved. Further, when the content of the spraying material particles is low, flowability of the slurry is improved, thereby it is preferable for slurry supply. The content of spraying material particles is more preferably up to 65 wt %, even more preferably up to 60 wt %, most preferably up to 52 wt %. When a high flowability is needed, a lower content of the thermal spraying material can be adopted, and the content in the case is preferably up to 45 wt %, more preferably up to 40 wt %, even more preferably up to 35 wt %. On the other hand, the content of the spraying material particles in the whole of the spraying slurry is preferably at least 10 wt %. When the content of the spraying material particles in the spraying slurry is high, adhesive efficiency of a sprayed coating formed by thermal spraying of the slurry is improved, thereby it is possible to reduce consumed amount of slurry or to improve a thermal spraying yield. Further, when the content of the spraying material particles is high, a spraying time can be shortened. The content of spraying material particles is more preferably at least 15 wt %, even more preferably at least 20 wt %.

The spraying slurry may include particles other than the spraying material of the invention, for example, particles of a rare earth compound not including the composite oxide containing a rare earth and aluminum, in case of a small amount which does not impact to the effects of the present invention. The particles other than the spraying material of the invention is preferably up to 10 wt %, more preferably up to 5 wt %, even more preferably 3 wt % to the spraying material of the invention included in the spraying slurry. Most preferably, the spraying slurry is substantively free of the particles other than the spraying material of the invention. Examples of the rare earth compound constituting the particles other than the spraying material include a rare earth oxide, a rare earth fluoride, a rare earth oxyfluoride, a rare earth hydroxide, a rare earth carbonate, and so on.

When the spraying material of the invention is dispersed with a dispersion medium to form a spraying slurry, one or more kinds of dispersion mediums selected from aqueous dispersion mediums are preferably used. For the aqueous dispersion medium, water alone or a mixture of water and an organic solvent may be used. Examples of the organic medium include, for example, an alcohol, an ether, an ester, a ketone, and so on, however not limited thereto. In particular, more preferable examples include a monohydric or dihydric alcohol having 2 to 6 carbon atoms, an ether having 3 to 8 carbon atoms such as ethyl cellosolve, a glycol ether having 4 to 8 carbon atoms such as dimethyldiglycol (DMDG), a glycol ester having 4 to 8 carbon atoms such as ethyl cellosolve acetate and butyl cellosolve acetate, and a cyclic ketone having 6 to 9 carbon atoms such as isophorone. A water-soluble organic solvent which can be mixed with water is more suitable for the organic solvent. Most preferable dispersion medium is water or a mixture of water and an alcohol. When the mixture of water and an organic solvent is used, as a mixing ratio of the water and organic solvent, a content of the water is preferably at least 50 wt %, more preferably at least 70 wt %, and preferably less than 100 wt %, more preferably up to 99 wt %, and a content of the organic solvent is preferably more than 0 wt %, more preferably at least 1 wt %, and preferably up to 50 wt %, more preferably up to 30 wt %.

When the spraying material of the invention is dispersed with a dispersion medium to form a spraying slurry, the spraying slurry preferably includes a dispersing agent to prevent agglomeration of particles effectively. A content of the dispersing agent in the whole of the spraying slurry is preferably up to 3 wt %. As the dispersing agent, a cationic dispersing agent, an anionic dispersing agent, a nonionic dispersing agent, and the like are used, however, not limited thereto. Examples of the cationic dispersing agent include a polyalkyleneimine-based cationic dispersing agent, a polyalkylenepolyamine-based cationic dispersing agent, a quaternary ammonium-based cationic dispersing agent, and an alkylamine-based cationic dispersing agent. Examples of the anionic dispersing agent include a polycarboxylic acid-based anionic dispersing agent, a polyacrylic acid-based anionic dispersing agent, and a polysulfonic acid-based anionic dispersing agent. Examples of the nonionic dispersing agent include a polyvinyl alcohol-based nonionic dispersing agent and a polyacrylamide-based nonionic dispersing agent. A content of the dispersing agent in the spraying slurry is more preferably up to 2 wt %, even more preferably up to 1 wt %.

The spraying slurry preferably has a viscosity of less than 15 mPa·s. A low viscosity provides active movement of particles in the slurry and improvement of flowability of the slurry. The viscosity of the slurry is more preferably up to 10 mPa·s, even more preferably up to 7 mPa·s. A lower limit of the viscosity is preferably at least 1 mPa·s, more preferably at least 1.5 mPa·s, even more preferably at least 2 mPa·s, however not limited thereto.

The spraying slurry preferably has a particle sedimentation rate of at least 50 µm/s. A high sedimentation rate means that particles are mobile in the slurry with less effect of resistance from surround. A high sedimentation rate results in improvement of flowability of particles included in the slurry. The sedimentation rate is more preferably at least 55 µm/s, even more preferably at least 60 µm/s.

The spraying material of the invention may be prepared by, for example, a method including steps of:

(A) forming a slurry by dispersing an aluminum oxide in an aqueous solution of a rare earth salt;

(B) crystalizing a precursor containing the rare earth and aluminum, as a precipitate, by adding a precipitant to the slurry;

(C) collecting the precipitate by a solid-liquid separation; and (D) firing the precursor containing the rare earth and aluminum under an oxygen-containing gas atmosphere.

In this method, a precursor is preliminarily provided for preparing the spraying material. In the step (A), a slurry is formed by dispersing an aluminum oxide in an aqueous solution of a rare earth salt. At this time, with respect to the rare earth salt and aluminum oxide, a ratio of the rare earth salt and aluminum oxide is preferably adjusted such that the ratio of the rare earth and aluminum contained in the resulting spraying material corresponds to a ratio within the ranges of the above-mentioned relative content of the rare earth oxide ($R_2O_3$) and the relative content of the aluminum oxide ($Al_2O_3$) in the spraying material. Examples of the rare earth salt include a nitrate, a chloride, and so on.

Next, in the step (B), a precipitant is added to the slurry. The precipitant is added into the aqueous solution of a rare earth salt in which the aluminum oxide is uniformly dispersed. Examples of the precipitant include oxalic acid, urea, ammonium carbonate, ammonium hydrogencarbonate, and so on. The amount of the precipitant added is preferably 5 to 20 times of the molar amount of the rare earth (R). When the precipitant is added into the slurry, the rare earth salt reacts with the precipitant, and the precursor containing the rare earth and aluminum is crystallized as a precipitate. The reaction temperature is usually 70 to 100° C., and the reaction time is usually 2 to 12 hours.

Next, in the step (C), the precipitate which is the precursor containing the rare earth and aluminum is separated by a solid-liquid separation such as a filtration with optional washing, and the precursor containing the rare earth and aluminum is collected as hydrous solids. If needed, the collected precipitate may be pre-fired under an oxygen-containing gas atmosphere such as air atmosphere. The pre-firing is performed, for example, at a temperature of 600 to 1,000° C., and for 1 to 8 hours. Notably, the pre-firing is applied such that the reaction from the precursor to the spraying material of the present invention is not completed. After the pre-firing, the precipitate may be crushed by a crusher such as a hammer mill, if needed.

Next, in the step (D), the precursor containing the rare earth and aluminum is fired under an oxygen-containing gas atmosphere such as air atmosphere. Herein, before firing of the precursor, granule may be formed from the particles of the precursor by granulation. The granulation is a method of forming particles having a large particle size by collecting and integrating particles having a small particle size, and generally, particles having voids between the integrated particles having a small particle size are obtained. A firing temperature is preferably 900 to 1,700° C. The firing temperature is more preferably at least 1,000° C., even more preferably at least 1,100° C., most preferably at least 1,200° C. A firing time is generally, 2 to 6 hours.

When a spraying material having an average particle diameter D50 of 1 to 10 μm is prepared, the particles tend to agglomerate strongly after firing. Thus, if needed, the obtained spraying material after firing may be pulverized by, for example, a ball mill or a jet mill, and may be sieved.

When a spraying material having an average particle diameter D50 of 10 to 50 μm is prepared, granulation is effective for preparing the spraying material. In this case, the preparing method may include steps of, for example, firing the obtained precursor at 900 to 1,700° C.; optionally pulverizing by, for example, a ball mill or a jet mill; optionally sieving; preparing a slurry of the obtained powder; granulating by a spray dryer; and further firing at 1,100 to 1,700° C. In this case, the resulting spraying material may be sieved, if needed.

According to the invention, a sprayed coating (a surface layer coating) including a composite oxide containing a rare earth and aluminum which is suitably applied to parts or members for semiconductor manufacturing apparatus can be formed directly or via an underlaying coating (a lower layer coating) on a substrate, for example, by using the spraying material of the invention. Further, a sprayed member including the sprayed coating (surface layer coating) which is formed directly on a substrate or via the underlaying coating (lower layer coating) on a substrate can be manufactured.

Examples of a material of the substrate include an inorganic compound (ceramics) such as stainless steel, aluminum, nickel, chromium, zinc and alloys thereof, alumina, zirconia, aluminum nitride, silicon nitride, silicon carbide and quartz glass, and carbon, and so on, however not limited thereto. A suitable material is selected in accordance with the use (for example, for a semiconductor manufacturing apparatus) of the sprayed member. For example, in the case of an aluminum metal or aluminum alloy substrate, a substrate applied with alumite treatment having acid resistance is preferable. A shape of the substrate may be, for example, a flat plate shape or a cylinder shape, however, not limited thereto.

When a sprayed coating is formed on a substrate, for example, it is preferable that the surface of the substrate on which the sprayed coating will be formed is degreased with acetone and subjected to a surface roughening treatment using an abrasive such as corundum to increase a surface roughness Ra. By the surface roughening treatment of the substrate, it is possible to effectively suppress peeling of the coating caused by difference in the thermal expansion coefficient between the sprayed coating and the substrate. The grade of the surface roughening treatment may be appropriately adjusted in accordance with the material of the substrate.

By forming preliminary a lower layer coating on a substrate before a sprayed coating is formed, the sprayed coating can be formed via an underlaying coating. The underlaying coating may form to 50 to 300 μm thick. When the sprayed coating is formed on the lower layer coating, preferably in contact with the lower layer coating, the underlaying coating and the sprayed coating can be formed as the lower layer coating and the surface layer coating, respectively, thereby the coating is formed as a coating having a multilayer structure.

Examples of a material of the underlaying coating include a rare earth oxide, a rare earth fluoride, a rare earth oxyfluoride, and the like. As the rare earth constituting the material of the underlaying coating, the same elements exemplified as the rare earth (R) in the spraying material can be exemplified, and yttrium (Y) is preferable. The underlaying coating can be formed by thermal spraying such as atmospheric plasma spraying or suspension plasma spraying, under normal pressure.

The underlaying coating has a porosity of preferably up to 5%, more preferably up to 4%, even more preferably up to 3%. A lower limit of the porosity is normally at least 0.1%, however not limited thereto. The underlaying coating has a surface roughness Ra of preferably up to 10 µm, more preferably up to 6 µm. A low surface roughness Ra is preferable, however, a lower limit of the surface roughness Ra is normally at least 0.1 µm. When the sprayed coating as the surface layer coating is formed on the lower layer coating having a low Ra, preferably in contact with the lower layer coating, it is preferable since the surface roughness Ra of the surface layer coating can also be reduced.

The lower layer coating having such a low porosity and/or a low surface roughness Ra may be formed by, for example, a method including steps of providing, as a source material, a single particle powder or a granulated spray powder having an average particle size D50 of at least 0.5 µm, preferably at least 1 µm, and up to 50 µm, preferably up to 30 µm, and thermal spraying with melting particles sufficiently by plasma spraying or explosion spraying, however, not limited thereto. The method can form a dense lower layer coating having a low porosity and/or a low surface roughness Ra. It is noted that "single particle powder" is a powder composed of particles that are spherical particles, angular particles or grinded particles, and have a solidly packed interior. When the single particle powder is used, even if the single particle powder has a smaller particle size than the granulated spray powder, since the single particle powder consists of particles having a solidly packed interior, splat diameter is small. Thus, it can form a lower layer coating in which cracks are suppressed.

The surface roughness Ra of the lower layer coating can be reduced by a surface machining such as a mechanical polishing (surface grinding, inner cylinder processing, mirror surface processing, etc.), blasting using fine beads, hand polishing using a diamond pad, and the like.

A thermal spraying method of the invention to form a sprayed coating (a surface layer coating) by using a spraying material is preferably a plasma spraying, however, not limited thereto. The plasma spraying may be atmospheric plasma spraying or suspension plasma spraying.

Plasma gases used to form plasma in atmospheric plasma spraying may include argon gas alone, nitrogen gas alone, and a mixed gas consisting of at least two kinds of gases selected from the group consisting of argon gas, hydrogen gas, helium gas and nitrogen gas, however, not limited thereto. A spraying distance in atmospheric plasma spraying is preferably up to 150 mm. A shorter spraying distance imparts improvement of adhesion efficiency, increase of hardness, and reduction of porosity, of the sprayed coating. The spraying distance is more preferably up to 140 mm, even more preferably up to 130 mm. A lower limit of the spraying distance is preferably at least 50 mm, more preferably at least 60 mm, even more preferably 70 mm, however not limited thereto.

Plasma gases used to form plasma in suspension plasma spraying may include a mixed gas consisting of at least two kinds of gases selected from the group consisting of argon gas, hydrogen gas, helium gas and nitrogen gas, preferably a mixed gas of three kinds consisting of argon gas, hydrogen gas and nitrogen gas, more preferably a mixed gas of four kinds consisting of argon gas, hydrogen gas, helium gas and nitrogen gas, however, not limited thereto. A spraying distance in suspension plasma spraying is preferably up to 100 mm. A shorter spraying distance imparts improvement of adhesion efficiency, increase of hardness, and reduction of porosity, of the sprayed coating. The spraying distance is more preferably up to 90 mm, even more preferably up to 80 mm. A lower limit of the spraying distance is preferably at least 50 mm, more preferably at least 55 mm, even more preferably 60 mm, however not limited thereto.

When a sprayed coating is formed on a substrate or on a coating (a lower layer coating) formed on a substrate, the thermal spraying is preferably conducted with cooling the substrate, and/or the coating (lower layer coating) formed on the substrate, and further with cooling the formed sprayed coating (surface layer coating). The cooling may be, for example, air cooling or water cooling.

Particularly, a temperature of the substrate or the substrate and the coating formed on the substrate is preferably at least 100° C. during thermal spraying. When a higher temperature is applied, bonding between the substrate and the resulting sprayed coating, or the coating (lower layer coating) formed on the substrate and the resulting sprayed coating becomes strong, and a dense sprayed coating can be formed. Further, when the temperature is higher, quenching stress generates, thereby a hardness of the resulting sprayed coating is improved. During thermal spraying, the temperature of the substrate, or the substrate and the coating formed on the substrate is more preferably at least 130° C., even more preferably at least 150° C.

On the other hand, a temperature of the substrate or the substrate and the coating formed on the substrate is preferably up to 300° C. during thermal spraying. When a lower temperature is applied, damage or deformation of the substrate or the substrate and the coating formed on the substrate caused by heat can be prevented, thereby peeling between the substrate and the resulting sprayed coating, or the coating (lower layer coating) formed on the substrate and the resulting sprayed coating can be prevented. During thermal spraying, the temperature of the substrate, or the substrate and the coating formed on the substrate is more preferably up to 270° C., even more preferably up to 250° C. The temperature can be accomplished by controlling cooling ability.

Other spraying conditions such as a supply rate of the spray material (spraying slurry), amounts of gas supply, and an applied power (current value, and voltage value) in plasma spraying are not particular limited, commonly known conditions can be applied. They may be adjusted appropriate in accordance with the substrate, the spraying material, the application of the resulting sprayed member, and the like.

In particular, as described above, when the sprayed coating is formed directly on the substrate, it is possible to form a harder and dense sprayed coating that is hard to peel by increasing the surface roughness Ra of the substrate surface on which the sprayed coating is formed, and further applying the above-mentioned temperature. In such a case, the surface roughness Ra of the formed sprayed coating tends to be high. Thus, when the surface roughness Ra is decreased by mechanical polishing (surface grinding, inner cylinder processing, mirror surface processing, etc.), blasting using fine beads, hand polishing using a diamond pad, and the like, it is possible to form a lubricative sprayed coating that is hard to peel, and is a harder and dense coating having a low surface roughness Ra.

The sprayed coating of the invention is suitable for use as parts or members in a plasma etching apparatus which is employed in a semiconductor manufacturing process. The sprayed coating of the invention preferably includes a rare earth (R), aluminum and oxygen, and a crystalline phase of a composite oxide containing the rare earth (R) and aluminum. The sprayed coating of the invention has superior plasma etching resistance (corrosion resistance) with reduced amount of particles generated by a corrosive halogen-based gas plasma.

The sprayed coating of the invention preferably includes, as the crystalline phase of a composite oxide containing the rare earth and aluminum, a crystalline phase of a composite oxide that includes a crystalline phase having a rare earth-rich composition compared to the stoichiometric composition of rare earth aluminum monoclinic ($R_4Al_2O_9$), and having a structure such that Al atom sites in the rare earth aluminum monoclinic ($R_4Al_2O_9$) are partially substituted with the rare earth (R) atoms.

The sprayed coating including the crystalline phase of a composite oxide that includes a crystalline phase having a rare earth-rich composition compared to the stoichiometric composition of rare earth aluminum monoclinic ($R_4Al_2O_9$) can be formed, for example, by thermal spraying, particularly, by plasma spraying, of the spraying material of the invention. The crystalline phase of a composite oxide that includes a crystalline phase having a rare earth-rich composition compared to the stoichiometric composition of rare earth aluminum monoclinic ($R_4Al_2O_9$) can be confirmed by an XRD diffraction peak detected at a diffraction angle that is 0.05 to 0.5° (in difference) lower than the diffraction angle attributed to the maximum XRD diffraction peak of the rare earth aluminum monoclinic ($R_4Al_2O_9$), particularly, the diffraction angle attributed to the maximum XRD diffraction peak of the rare earth aluminum monoclinic ($R_4Al_2O_9$) in the spraying material used for forming the sprayed coating. The difference is preferably at least 0.1°, and preferably up to 0.3°.

In case that, for example, the rare earth aluminum monoclinic ($R_4Al_2O_9$) is yttrium aluminum monoclinic ($Y_4Al_2O_9$), the maximum peak is generally a diffraction peak attributed to the (−122) plane of the crystalline lattice, however, not limited thereto. The diffraction peak is normally detected at around 2θ=29.6°. Further, a peak of the crystalline phase having a rare earth-rich composition compared to the stoichiometric composition of rare earth aluminum monoclinic ($R_4Al_2O_9$) is normally detected also at a part or the whole of diffraction angles other than the maximum peak, and at a diffraction angle that is lower than the peak attributed to the XRD diffraction peak of the rare earth aluminum monoclinic ($R_4Al_2O_9$).

In the crystalline phase of the composition oxide having a rare earth-rich composition compared to the stoichiometric composition of rare earth aluminum monoclinic ($R_4Al_2O_9$), a part of Al sites ($Al^{3+}$ ions) in $R_4Al_2O_9$ is replaced with R sites ($R^{3+}$ ions) by isomorphous substitution, and the lattice spacing d is expanded. Diffraction peaks of the composite oxide having a rare earth-rich composition compared to the stoichiometric composition of rare earth aluminum monoclinic ($R_4Al_2O_9$) depend to Bragg's condition of diffraction: 2d sin θ=nλ, wherein d is a lattice spacing, θ is a glancing angle, n is a positive integral number, and λ is a wavelength of X-ray. Thus, it is considered that the peaks appear at a lower angle than the diffraction angle of the diffraction peak attributed to the rare earth aluminum monoclinic ($R_4Al_2O_9$) because the glancing angle θ of X-ray is decreased. In case that, for example, the rare earth aluminum monoclinic ($R_4Al_2O_9$) is yttrium aluminum monoclinic ($Y_4Al_2O_9$), a part of $Al^{3+}$ ions (ion radius of 0.533 Å in six-coordination) in $Y_4Al_2O_9$ is replaced with $R^{3+}$ ions (ion radius of 0.900 Å in six-coordination) that have larger ion radius by isomorphous substitution, then, the lattice spacing d is expanded.

Diffraction peaks of the composite oxide having a rare earth-rich composition compared to the stoichiometric composition of rare earth aluminum monoclinic ($R_4Al_2O_9$) is not listed in X-ray diffraction databases such as the JCPDS. However, detection of the peak sifting to lower angle than the diffraction angle of the diffraction peak attributed to the rare earth aluminum monoclinic ($R_4Al_2O_9$) means that the crystalline phase having a rare earth-rich composition compared to the stoichiometric composition of rare earth aluminum monoclinic ($R_4Al_2O_9$) exists.

In view point of corrosion resistance, rare earth oxide ($R_2O_3$) is superior to the rare earth aluminum monoclinic ($R_4Al_2O_9$). Thus, it can be said that the composite oxide having a rare earth-rich composition compared to the stoichiometric composition of rare earth aluminum monoclinic ($R_4Al_2O_9$) has an advantage in corrosion resistance. A sprayed coating including a mixed phase of a crystalline phase of the rare earth aluminum monoclinic ($R_4Al_2O_9$) and a crystalline phase of rare earth oxide ($R_2O_3$) have not been ever obtained by plasma spraying. Particularly, a sprayed coating including the crystalline phase of the composite oxide having a rare earth-rich composition compared to the stoichiometric composition of rare earth aluminum monoclinic ($R_4Al_2O_9$) has not been known. The sprayed coating of the invention that includes the crystalline phase of the composite oxide having a rare earth-rich composition compared to the stoichiometric composition of rare earth aluminum monoclinic ($R_4Al_2O_9$) has superior plasma etching resistance (corrosion resistance) with extremely reduced amount of particles generated by a corrosive halogen-based gas plasma.

The sprayed coating of the invention may include a crystalline phase of a rare earth oxide ($R_2O_3$). Inclusion of the rare earth oxide is advantageous in that the corrosion resistance of the thermal spray coating is improved.

The sprayed coating of the invention may include at least one crystalline phase selected from the group consisting of a rare earth aluminum monoclinic ($R_4Al_2O_9$), a rare earth aluminum perovskite ($RAlO_3$), and a rare earth aluminum garnet ($R_3Al_5O_{12}$). Inclusion of $R_4Al_2O_9$, $RAlO_3$ or $R_3Al_5O_{12}$ is advantageous in that an amount of particles generated from the sprayed coating is reduced.

When the rare earth oxide ($R_2O_3$) content and the aluminum oxide ($Al_2O_3$) content are, respectively, calculated from the basis of an rare earth (R) content and an aluminum content in the sprayed coating, the sprayed coating of the invention preferably has a composition corresponding to a relative rare earth oxide ($R_2O_3$) content of 75 to 99 wt % and a relative aluminum oxide ($Al_2O_3$) content of 1 to 25 wt % in the total content of the rare earth oxide ($R_2O_3$) and the aluminum oxide ($Al_2O_3$). The relative content calculated as the rare earth oxide ($R_2O_3$) content is more preferably at least 80 wt %, even more preferably at least 85 wt %, and more preferably up to 97 wt %, even more preferably up to 95 wt %. On the other hand, the relative content calculated as the aluminum oxide ($Al_2O_3$) is more preferably at least 3 wt %, even more preferably at least 5 wt %, and more preferably up to 20 wt %, even more preferably up to 15 wt %.

In the sprayed coating of the invention, the total weight of main oxide component (a composite oxide containing rare earth and aluminum, a rare earth oxide, and an aluminum oxide) is assumed as the total weight of the relative content of the rare earth oxide and the relative content of the aluminum oxide. Further, a weight of $R_2O_3$ as basic composition of a rare earth oxide and a weight of $Al_2O_3$ as basic composition of aluminum oxide that are converted from a rare earth content and an aluminum content in the sprayed coating are assumed as the relative contents of the rare earth oxide and the aluminum oxide, respectively. Preferably, the sprayed coating is substantively free of the oxides except to the main oxide content, i.e., the sprayed coating substantively consists of one or more species constituting the main oxide component, however not limited thereto. The contents of the rare earth and aluminum in the sprayed coating can be measured by, for example, ICP emission optical spectroscopy, fluorescence X-ray analysis, or the like. Since rare earth and aluminum constituting the main oxide component can be selectively measured, fluorescence X-ray analysis is preferable.

The rare earth (R) in the sprayed coating of the invention includes at least one element selected from the group consisting of yttrium (Y) and lanthanoids from lanthanum (La) to lutetium (Lu) that have atomic numbers from 57 to 71, respectively. The rare earth (R) is preferably selected from the group consisting of yttrium (Y), gadolinium (Gd), terbium (Tb), dysprosium (Dy), holmium (Ho), erbium (Er), thulium (Tm), ytterbium (Yb), and lutetium (Lu), more preferably selected from the group consisting of yttrium (Y), gadolinium (Gd), dysprosium (Dy), erbium (Er), and ytterbium (Yb). The rare earth (R) may be used as single element or a combination of two or more elements.

The sprayed coating has a surface roughness Ra of up to preferably up to 8 μm. When the sprayed coating has a surface roughness Ra of up to 8 μm, it is advantageous in that generation of particles caused by a halogen-based gas plasma can be further suppressed. The surface roughness Ra is more preferably up to 7 μm, even more preferably up to 6 μm. On the other hand, a low surface roughness Ra is preferable, however, a lower limit of the surface roughness Ra is normally at least 0.1 μm. When the surface roughness Ra is at least 0.1 μm, it is hard to damage the sprayed coating by excessively machining during adjustment of coating thickness, and it is hard to cause particle separation.

The sprayed coating of the invention preferably has a thickness of at least 10 μm. when the thickness is at least 10 μm, corrosion resistance to a halogen-based gas plasma is more effectively exerted. The thickness is more preferably at least 30 μm, even more preferably at least 50 μm. On the other hand, an upper limit of the thickness is preferably up to 500 μm. When the thickness of the sprayed coating is up to 500 μm, the sprayed coating is hard to be peeled from the substrate or the coating (lower layer coating) formed on the substrate. The upper limit of the thickness is more preferably up to 400 μm, even more preferably up to 300 μm.

The sprayed coating of the invention preferably has a Vickers hardness HV0.3 of at least 600. When the Vickers hardness HV0.3 is at least 600, it is hard to be etched the surface of coating by plasma etching of a halogen-based gas plasma, and corrosion resistivity becomes higher. The Vickers hardness HV0.3 is more preferably at least 630, even more preferably at least 650. On the other hand, a high Vickers hardness HV0.3 is preferable, however, an upper limit of the Vickers hardness HV0.3 is normally up to 1,000. When the Vickers hardness HV0.3 is up to 1,000, the sprayed coating is hard to be peeled from the substrate or the coating (lower layer coating) formed on the substrate.

The sprayed coating of the invention preferably has a porosity of up to 5%. When the porosity is up to 5%, it is advantageous in that generation of particles caused by a halogen-based gas plasma can be further suppressed. Further, it is advantageous in that corrosion resistivity tends to be improved. The porosity is more preferably up to 4%, even more preferably up to 3%. Notably, a lower limit of the porosity is normally at least 0.1%. however, not limited thereto.

EXAMPLES

Examples of the invention are given below by way of illustration and not by way of limitation.

Example 1

Yttrium nitrate ($Y(NO_3)_3$) and aluminum oxide ($Al_2O_3$) were provided in the ratio indicated in Table 1 so that the relative contents of the yttrium oxide ($Y_2O_3$) and the relative content of the aluminum oxide ($Al_2O_3$) in the total content of the yttrium oxide ($Y_2O_3$) and the aluminum oxide ($Al_2O_3$) match to the ratio in the resulting spraying material. Then, a slurry was prepared by dispersing a powder of aluminum oxide ($Al_2O_3$) having an average particle size D50 of 0.5 μm to 0.01 mol/L of yttrium nitrate aqueous solution. Next, urea was added into the solution in the corresponding amount of 10 mol of urea per 1 mol of yttrium nitrate, the solution was stirred, and a precipitate was crystalized. Then, the obtained precipitate was collected as a precursor containing rare earth (yttrium) and aluminum by solid-liquid separation.

Next, the obtained precipitate (precursor) was dispersed in water to prepare a slurry with adding carboxymethyl cellulose as a binder. The obtained slurry was granulated by using a spray drier, and the obtained granulated particles were fired at 1,600° C. for 2 hours in air atmosphere to obtain a spraying material.

Crystalline phases of the obtained spraying material were identified by X-ray diffraction (XRD), constituent crystals were analyzed, and the maximum peak was specified. Then, an intensity ratio I(R)/I(RAL) of an integral intensity I(R) of the maximum diffraction peak attributed to a rare earth oxide ($R_2O_3$) to an integral intensity I(RAL) of the maximum diffraction peak attributed to a rare earth aluminum monoclinic ($R_4Al_2O_9$) was calculated. X-ray diffraction (XRD) was measured by an X-ray diffraction analyzer, X'Pert PRO/MPD, manufactured by Malvern Panalytical Ltd.), and by an analysis software, HighScore Plus, manufactured by Malvern Panalytical Ltd.), crystalline phases were identified and the integral intensities ware calculated. The measurement conditions were as follows: characteristic X-ray: Cu-Kα (tube voltage: 45 kV, tube current: 40 mA), scan range 2θ: 5 to 70°, step size: 0.0167113°, time-per-step: 13.970 seconds, scan speed: 0.151921°/sec. A BET specific surface area S and a bulk density ρ were measured, and S/ρ was calculated. From the results of quantification of yttrium and aluminum by X-ray fluorescence analysis, the ratio of yttrium and aluminum was calculated as the relative contents of the yttrium oxide ($Y_2O_3$) and the relative content of the aluminum oxide ($Al_2O_3$) in the total of both contents. Further, a particle size distribution (an average particle diameter D50) was measured. The results were shown in Table 1. Notably, a diffraction angle (2θ(RAL)) of the maximum peak attributed to the rare earth aluminum monoclinic ($R_4Al_2O_9$) is shown in Table 3. Detail of respective measurement or analysis is described later.

Example 2

Figure 1:
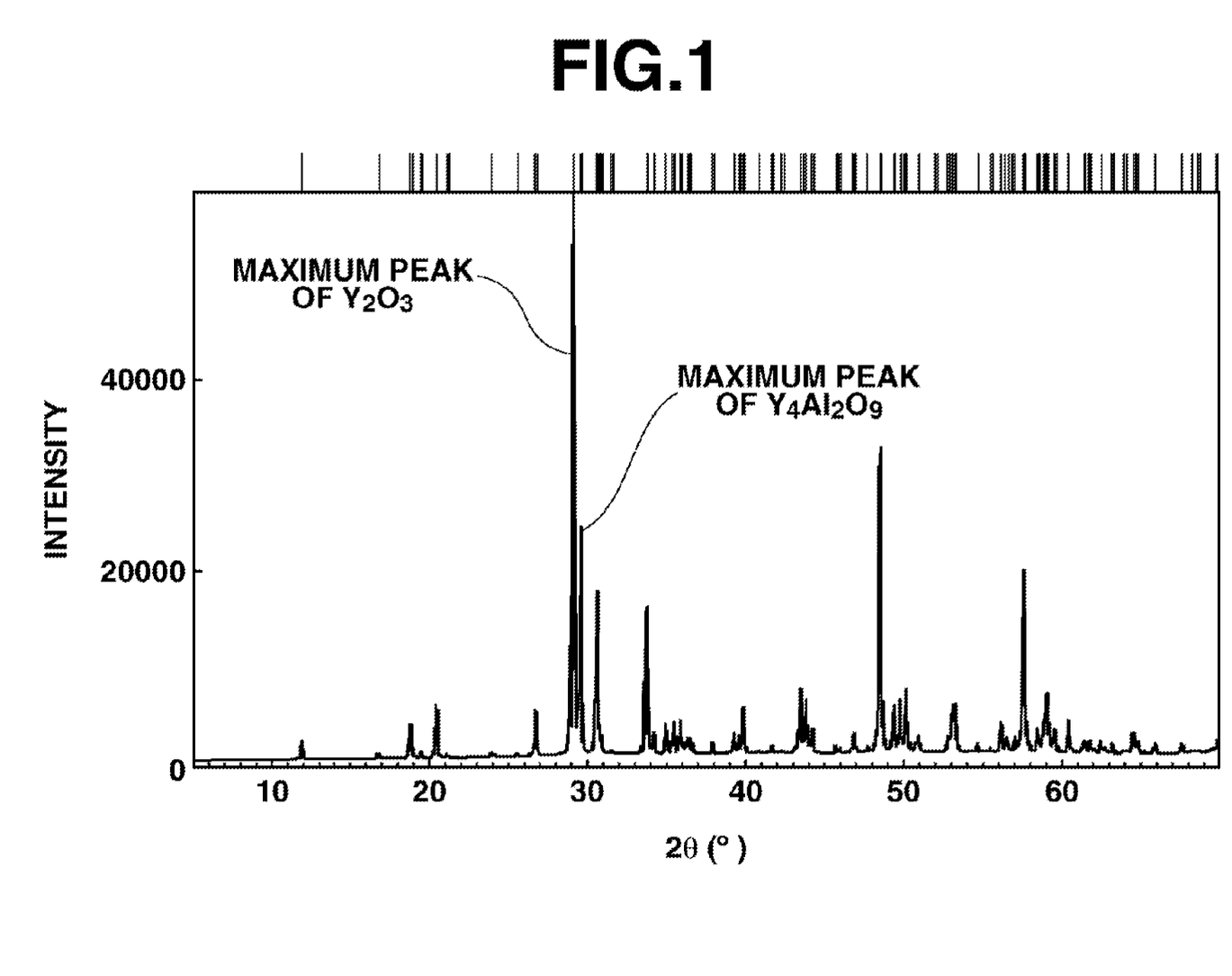
FIG. 1 is an X-ray diffraction profile of the spraying material obtained in Example 2.

A precursor was obtained by the same method in Example 1, and the obtained precursor was fired at 1,600° C. for 2 hours in air atmosphere, and pulverized by a jet mill to obtain a spraying material. The obtained spraying material was measured or analyzed by the same methods in Example 1. The results are shown in Tables 1 and 3. Further, the XRD profile is shown in FIG. 1.

Further, the obtained spraying material and a dispersing agent were mixed with a dispersion medium, and the spraying material was dispersed in the dispersion medium to obtain a spraying material in slurry form. The slurry concentration, the dispersion medium used, the dispersing agent used and the concentration of the dispersing agent in the slurry are shown in Table 2. Further, a viscosity of the obtained slurry was measured. The result is shown in Table 2. Notably, detailed measurement of the viscosity is described later.

Example 3

A spraying material was obtained by the same method in Example 2 except that the firing temperature and time for the precursor were set to 1,300° C. and 4 hours, respectively. The obtained spraying material was measured or analyzed by the same methods in Example 1. The results are shown in Tables 1 and 3. Further, a spraying material in slurry form was obtained by the same method in Example 2, and a viscosity was measured. The slurry concentration, the dispersion medium used, the dispersing agent used, the concentration of the dispersing agent in the slurry, and the viscosity are shown in Table 2.

Example 4

A precursor was obtained by the same method in Example 1 except that yttrium (Y) was changed to gadolinium (Gd) (yttrium nitrate: $Y(NO_3)_3$, as a source material, was changed to gadolinium nitrate: $Gd(NO_3)_3$), and the obtained precursor was fired at 1,200° C. for 2 hours in air atmosphere, and pulverized by a jet mill to obtain a spraying material. The obtained spraying material was measured or analyzed by the same methods in Example 1. The results are shown in Tables 1 and 3. Further, a spraying material in slurry form was obtained by the same method in Example 2, and a viscosity was measured. The slurry concentration, the dispersion medium used, the dispersing agent used, the concentration of the dispersing agent in the slurry, and the viscosity are shown in Table 2.

Example 5

A precursor was obtained by the same method in Example 1 except that yttrium (Y) was changed to ytterbium (Yb) (yttrium nitrate: $Y(NO_3)_3$, as a source material, was changed to ytterbium nitrate: $Yb(NO_3)_3$), and the obtained precursor was fired at 1,500° C. for 2 hours in air atmosphere, and pulverized by a jet mill to obtain a spraying material. The obtained spraying material was measured or analyzed by the same methods in Example 1. The results are shown in Tables 1 and 3. Further, a spraying material in slurry form was obtained by the same method in Example 2, and a viscosity was measured. The slurry concentration, the dispersion medium used, the dispersing agent used, the concentration of the dispersing agent in the slurry, and the viscosity are shown in Table 2.

Example 6

A spraying material obtained by the same method in Example 2 was measured or analyzed by the same methods in Example 1. The results are shown in Tables 1 and 3. Further, a spraying material in slurry form was obtained by the same method in Example 2, and a viscosity was measured. The slurry concentration, the dispersion medium used and the viscosity are shown in Table 2.

Comparative Example 1

Yttrium oxide ($Y_2O_3$) powder having an average particle size D50 of 1.2 μm was dispersed in water with adding carboxymethyl cellulose as a dispersing agent to prepare a slurry. The obtained slurry was granulated by s spray dryer to form granulated particles, and the obtained granulated particles were fired at 1,600° C. for 2 hours in air atmosphere to obtain a spraying material. The obtained spraying material was measured or analyzed by the same methods in Example 1. The results are shown in Table 1.

Comparative Example 2

Yttrium oxide ($Y_2O_3$) and aluminum oxide ($Al_2O_3$) were provided in the ratio indicated in Table 1 so that the relative contents of the yttrium oxide ($Y_2O_3$) and the relative content of the aluminum oxide ($Al_2O_3$) in the total content of the yttrium oxide ($Y_2O_3$) and the aluminum oxide ($Al_2O_3$) match to the ratio in the resulting spraying material. Then, a slurry was prepared by dispersing them in water with adding carboxymethyl cellulose as a dispersing agent. The obtained slurry was mixed and pulverized in a pot made of aluminum oxide of a ball mill by balls made of aluminum oxide for 24 hours. Next, the obtained slurry after mixing and pulverizing was granulated by s spray dryer to form granulated particles, and the obtained granulated particles were fired at 1,400° C. for 2 hours in air atmosphere to obtain a spraying material. The obtained spraying material was measured or analyzed by the same methods in Example 1. The results are shown in Table 1.

Comparative Example 3

Yttrium oxide ($Y_2O_3$) was fired at 1,600° C. for 2 hours in air atmosphere, pulverized by a jet mill, and sieved to obtain a spraying material. The obtained spraying material was measured or analyzed by the same methods in Example 1. The results are shown in Table 1. Further, a spraying material in slurry form was obtained by the same method in Example 2, and a viscosity was measured. The slurry concentration, the dispersion medium used, the dispersing agent used, the concentration of the dispersing agent in the slurry, and the viscosity are shown in Table 2.

TABLE 1

|  | Example | | | | | | Comparative Example | | |
| --- | --- | --- | --- | --- | --- | --- | --- | --- | --- |
|  | 1 | 2 | 3 | 4 | 5 | 6 | 1 | 2 | 3 |
| Crystalline phase by XRD | $Y_2O_3$ $Y_4Al_2O_9$ | | | $Gd_2O_3$ $Gd_4Al_2O_9$ | $Yb_2O_3$ $Yb_4Al_2O_9$ | $Y_2O_3$ $Y_4Al_2O_9$ | $Y_2O_3$ | $Y_3Al_5O_{12}$ | $Y_2O_3$ |
| I(R)/I(RAL) | 2 | 2.4 | 1.2 | 2.3 | 1.1 | 2.4 | — | — | — |
| Specific surface area S ($m^2/g$) | 2.5 | 1.2 | 1.7 | 1.1 | 2 | 1.2 | 0.6 | 3.8 | 0.8 |

TABLE 1-continued

|  | Example | | | | | | Comparative Example | | |
|---|---|---|---|---|---|---|---|---|---|
|  | 1 | 2 | 3 | 4 | 5 | 6 | 1 | 2 | 3 |
| Bulk density ρ (g/cm$^3$) | 1.38 | 0.75 | 0.58 | 0.9 | 1.1 | 0.75 | 2.04 | 0.8 | 0.92 |
| S/ρ | 1.8 | 1.6 | 2.9 | 1.2 | 1.8 | 1.6 | 0.3 | 4.8 | 0.9 |
| Rare earth oxide (wt %) | 89.7 | 91.9 | 86.9 | 93.5 | 92.5 | 91.9 | 100 | 57.5 | 100 |
| Aluminum oxide (wt %) | 10.3 | 8.1 | 13.1 | 6.5 | 7.5 | 8.1 | 0 | 42.5 | 0 |
| D50 (μm) | 38.1 | 2.9 | 2.1 | 3.8 | 1.8 | 2.9 | 30.4 | 40 | 3.2 |

TABLE 2

|  | Example | | | | | Comparative Example |
|---|---|---|---|---|---|---|
|  | 2 | 3 | 4 | 5 | 6 | 3 |
| Concentration of slurry (wt %) | 30 | 35 | 20 | 25 | 70 | 30 |
| Dispersion medium | water | water | 80 wt % of water + 20 wt % of ethanol | water | 70 wt % of water + 30 wt % of 2-propanol | water |
| Dispersing agent (wt %) | Polyalkylene-imine-based 1 | Polyvinyl alcohol-based 0.05 | Polyalkylene-imine-based 0.5 | Polyalkylene-imine-based 0.05 | nil | Polyalkylene-imine-based 3 |
| Viscosity of slurry (mPa · s) | 3 | 4 | 7 | 4 | 10 | 15 |

Examples 7 to 12 and Comparative Examples 4 to 6

A prayed coating was obtained by forming a sprayed coating directly or via an underlaying coating on a substrate by plasma spraying with using the spraying material of Example 1 to 5 or Comparative Example 1 to 3. The substrate was made of the material shown in Table 3, and the surface of the substrate was subjected to a surface roughening treatment by blast polishing using a corundum abrasive having a grain size shown in Table 3. The sprayed coating, as a surface layer coating shown in Table 3 was formed by atmospheric plasma spraying (APS) with using a spraying material in powder form in Example 7 and Comparative Examples 4 and 5, and formed by suspension plasma spraying (SPS) with using a spraying material in slurry form in Examples 8 to 12 and Comparative Example 6. The sprayed coating was formed, as the surface layer coating shown in Table 3, directly on the substrate (except for Example 8), or via the underlaying coating (lower layer coating) that was formed by atmospheric plasma spraying on the substrate (Example 8). Crystalline phases of the lower layer coating used in Example 8 were identified by X-ray diffraction (XRD), and constituent crystals were analyzed. A surface roughness Ra, a thickness and a porosity were measured. The results are shown in Table 3. Detail of respective measurement or analysis is described later.

The atmospheric plasma spraying was performed by a thermal spraying machine, SG-100, manufactured by Praxair S.T. Technology, Inc., under atmospheric pressure in normal pressure, and the suspension plasma spraying was performed by a thermal spraying, machine 100HE, manufactured by Progressive Co., Ltd., under atmospheric suspension plasma spraying in normal pressure. The conditions of atmospheric plasma spraying and suspension plasma spraying for forming the sprayed coating (surface layer coating) are shown in Table 4.

Figure 2:
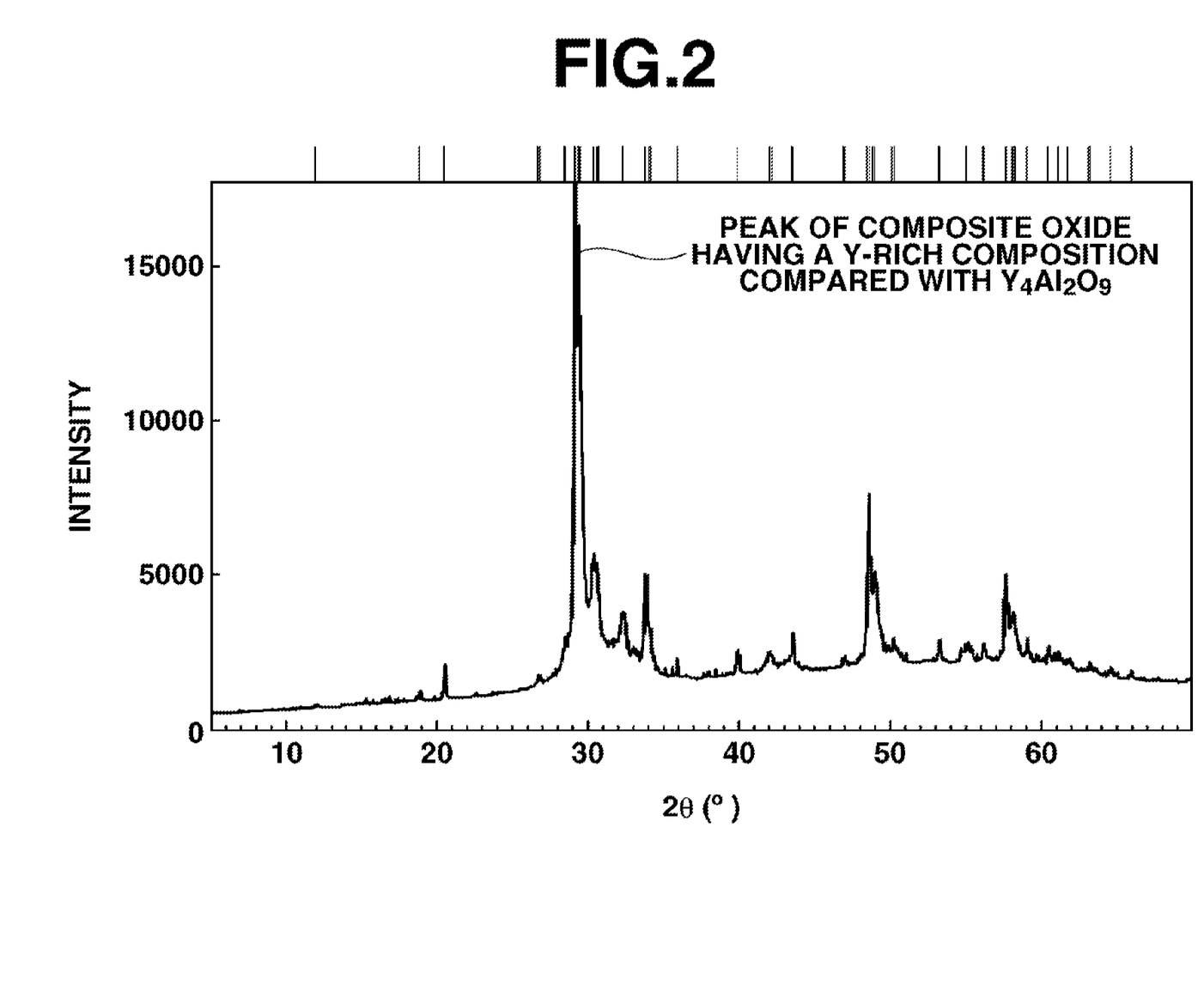
FIG. 2 is an X-ray diffraction profile of the sprayed coating obtained in Example 8.

Crystalline phases of the obtained sprayed coating (surface layer coating) were identified by X-ray diffraction (XRD), and constituent crystals were analyzed. A diffraction angle (2θ(R$^+$AL)) of a peak that positions at 0.05 to 0.5° (in difference) lower than the diffraction angle attributed to the maximum XRD diffraction peak of the rare earth aluminum monoclinic ($R_4Al_2O_9$) in the spraying material used. From the results of quantification of yttrium and aluminum by X-ray fluorescence analysis, the ratio of yttrium and aluminum was calculated as the relative contents of the yttrium oxide ($Y_2O_3$) and the relative content of the aluminum oxide ($Al_2O_3$) in the total of both contents. A surface roughness Ra, a thickness, a Vickers hardness HV0.3, and a porosity were measured. Further, as corrosion resistance of the sprayed coating and an amount of rare earth particles generated were evaluated by using the obtained sprayed member. The results are shown in Table 3. The XRD profile in Example 8 is shown in FIG. 2. The results are shown in Table 3. Detail of respective measurement, analysis or evaluation is described later.

TABLE 3

|  |  | Example | | | | | | Comparative Example | | |
|---|---|---|---|---|---|---|---|---|---|---|
|  |  | 7 | 8 | 9 | 10 | 11 | 12 | 4 | 5 | 6 |
| 2θ(RAL) (°) |  | 29.62 | 29.62 | 29.58 | 30.42 | 30.94 | 29.62 | — | — | — |
| Surface layer coating | 2θ(R$^+$AL) (°) | 29.52 | 29.45 | 29.43 | 30.24 | 30.73 | 29.47 | — | — | — |
|  | Crystalline phase other than (R$^+$AL) |  | $Y_2O_3$ $Y_4Al_2O_9$ $Y_3Al_5O_{12}$ |  | $Gd_2O_3$ $Gd_4Al_2O_9$ $Gd_3Al_5O_{12}$ | $Yb_2O_3$ $Yb_4Al_2O_9$ $Yb_3Al_5O_{12}$ | $Y_2O_3$ $Y_4Al_2O_9$ $Y_3Al_5O_{12}$ | $Y_2O_3$ | $Y_3Al_5O_{12}$ | $Y_2O_3$ |

TABLE 3-continued

|  |  | Example |  |  |  |  |  | Comparative Example |  |  |
|---|---|---|---|---|---|---|---|---|---|---|
|  |  | 7 | 8 | 9 | 10 | 11 | 12 | 4 | 5 | 6 |
|  | by XRD |  |  |  |  |  |  |  |  |  |
|  | Rare earth oxide (wt %) | 89.9 | 91.3 | 86.3 | 93.7 | 92.1 | 91.5 | 100 | 57.7 | 100 |
|  | Aluminum oxide (wt %) | 10.1 | 8.7 | 13.7 | 6.3 | 7.9 | 8.5 | 0 | 42.3 | 0 |
|  | Surface roughness Ra (μm) | 5.6 | 5 | 1.9 | 1.5 | 6 | 4.7 | 4.6 | 7.1 | 1.1 |
|  | Thickness (μm) | 300 | 50 | 100 | 100 | 100 | 150 | 200 | 150 | 100 |
|  | Vickers hardness HV0.3 | 820 | 920 | 770 | 650 | 730 | 850 | 490 | 700 | 600 |
|  | Porosity (%) | 1.6 | 0.7 | 0.5 | 0.9 | 0.6 | 0.8 | 3.8 | 3.3 | 0.1 |
|  | Corrosion resistance (average step) (μm) | 1.8 | 1.5 | 2.1 | 2.8 | 2.4 | 1.7 | 1.9 | 4 | 3.3 |
|  | Rare earth particles (μg/cm$^2$) | 1.2 | 0.6 | 0.8 | 1.3 | 1.5 | 0.9 | 7.3 | 0.8 | 3.2 |
| Lower layer coating | Crystalline phase by XRD | — | $Y_2O_3$ | — | — | — | — | — | — | — |
|  | Surface roughness Ra (μm) | — | 4.7 | — | — | — | — | — | — | — |
|  | Thickness (μm) | — | 150 | — | — | — | — | — | — | — |
|  | Porosity (%) | — | 2.2 | — | — | — | — | — | — | — |
| Substrate | Material | Aluminum oxide | Aluminum alloy | Alumite + Aluminum alloy |  |  |  | Aluminum alloy |  |  |
|  | Abrasive grain size | #60 | #60 | #150 | #150 | #60 | #60 | #60 | #60 | #150 |

TABLE 4

|  | Example |  |  |  |  |  | Comparative Example |  |  |
|---|---|---|---|---|---|---|---|---|---|
|  | 7 | 8 | 9 | 10 | 11 | 12 | 4 | 5 | 6 |
| Spraying material | 1 | 2 | 3 | 4 | 5 | 6 | 1 | 2 | 3 |
| Thermal spraying method | APS | SPS | SPS | SPS | SPS | SPS | APS | APS | SPS |
| Temperature of substrate (and lower layer coating) (° C.) | 200 | 180 | 150 | 130 | 220 | 160 | 100 | 120 | 160 |
| Plasma gas  Ar (L/mim) | 25 | 180 | 180 | 180 | 180 | 180 | 25 | 25 | 180 |
| $N_2$ (L/mim) | 0 | 70 | 70 | 70 | 70 | 70 | 0 | 0 | 70 |
| $H_2$ (L/mim) | 0 | 70 | 70 | 70 | 70 | 70 | 0 | 0 | 70 |
| He (L/mim) | 21 | 0 | 0 | 0 | 0 | 0 | 21 | 21 | 0 |
| Feed rate of spraying material (g/min) | 20 | 50 | 53 | 44 | 49 | 86 | 20 | 20 | 50 |
| Current (A) | 900 | 407 | 407 | 407 | 407 | 407 | 900 | 900 | 407 |
| Voltage (V) | 44 | 258 | 258 | 258 | 258 | 258 | 44 | 44 | 258 |
| Power (kW) | 40 | 105 | 105 | 105 | 105 | 105 | 40 | 40 | 105 |
| Spraying distance (mm) | 80 | 75 | 70 | 90 | 65 | 75 | 80 | 80 | 75 |

[X-Ray Diffraction (XRD)]

The characteristic X-ray was Cu-Kα, and a diffraction profile was obtained within a diffraction angle 2θ of 10° to 70°.

[BET Specific Surface Area]

The BET specific surface area was measured by a full automatic surface area analyzer, Macsorb HM model-1280, manufactured by Mountech Co., Ltd.

[Bulk Density]

The bulk density was measured by a power tester, PT-X, manufactured by Hosokawa Micron Corporation.

[Ratio of Rare Earth Oxide and Aluminum Oxide]

Contents of rare earth and aluminum were measured by X-ray fluorescence analysis method, and based on the measured values, the ratio of them was calculated as a ratio of the relative contents of the yttrium oxide ($Y_2O_3$) and the relative content of the aluminum oxide ($Al_2O_3$).

[Particle Size Distribution]

The volume-based particle size distribution was measured by a laser diffraction method, and an average particle size D50 was evaluated.

[Viscosity of Slurry]

The viscosity of slurry was measured by a viscometer, Type TVB-10, manufactured by Toki Sangyo Co., Ltd., at a rotation speed of 60 rpm and for a rotation time of 1 minute.

[Surface Roughness Ra]

The surface roughness Ra was measured by a surface roughness measuring instrument, HANDYSURF E-35A, manufactured by Tokyo Seimitsu Co., Ltd.

[Coating Thickness]

The coating thickness was measured by an eddy current coating thickness tester, LH-300J, manufactured by Kett Electric Laboratory.

[Vickers Hardness HV0.3]

The surface of the sprayed coating of a test piece was processed to a mirror surface having a surface roughness Ra of 0.1 μm. A Vickers hardness HV0.3 was measured at the processed mirror surface of the test piece by a micro Vickers hardness meter, HMV-G, manufactured by Shimadzu Corporation, at a load of 2.942 N and for a holding time of 10 seconds. The results were evaluated as an average value of five points.

[Porosity]

A test piece was embedded in resin, and cut out at cross section surface. The surface was processed to a mirror surface having a surface roughness Ra of 0.1 μm, then, a photograph of the surface was taken by an electron microscope (magnification: 1,000 times). After imaging in five view fields (imaging area per one visual field: 0.01 mm$^2$), a porosity was quantified by an image analysis software "ImageJ" (public software by National Institutes of Health). A porosity was calculated as a percentage of the pore area with respect to the whole area of the image, and the results were evaluated as an average value of five view fields. The measurement of the porosity was specifically performed according to the following procedure.

(1) A test piece of the coating cut into a size of 9 mm×9 mm square and 5 mm thick (including a substrate) is embedded into a resin.

(2) A cross section is mirror-polished (surface roughness Ra=0.1 μm).

(3) A cross-sectional photograph (backscattered electron image) with a magnification of 1,000 times is taken by SEM.

(4) A range for image processing of a cross-sectional photograph is specified and trimming processing is performed, by using the image analysis software "ImageJ".

(5) The processed image is converted to a grayscale image.

(6) As a setting of a threshold value of the image, a low-level threshold value is set to 0, and a high-level threshold value is set to a value at which all voids are colored red.

(7) The processed image is converted to a binarized image.

(8) The total area of the void portion is calculated.

(9) The length unit is set to pixels, and the total area (pixel) of the void portion is obtained.

(10) A threshold of the image is set such that a low-level threshold is 0, and a high-level threshold is 255, then the whole area (pixel) of the image is obtained.

(11) A porosity is calculated by dividing the total area (pixel) of the void portion by the whole area (pixel) the image.

[Test and Evaluation of Corrosion Resistance]

A surface of the sprayed coating (surface layer coating) of a test piece (sprayed member) was finished to a mirror surface having a surface roughness Ra of 0.1 μm. After preparing a portion covered with a masking tape and an exposed portion of the coating, the test piece was set in an apparatus for reactive ion plasma test, and exposed to a plasma under conditions of a plasma output of 440 W, gas spices of $CF_4$+20 vol % $O_2$, a flow rate of 20 sccm, a gas pressure of 5 Pa, and a test time of 8 hours. To the test piece after the plasma exposure, a height of the step caused by corrosion between the portion covered with the masking tape and the exposed portion of the coating was measured by a contact-type surface profile measuring system, Dektak 3030, manufactured by Bruker Nano Inc. The results of corrosion resistance were evaluated by calculating an average value of four points. In the evaluation by this test, the average value of the height of the steps (average height in step) is preferably up to 3.5 μm. When the average step height in step is more than 3.5 μm, plasma etching resistance may not be exhibited sufficiently for using in a plasma etching apparatus. The average step height in step is more preferably up to 3.2 μm, even more preferably up to 3 μm.

[Test and Evaluation of Amount of Rare Earth Particles Generated]

A test piece (sprayed member) was subjected to ultrasonic cleaning (output: 200 W, cleaning time: 30 minutes), dried, then, the test piece was immersed into 20 mL of ultrapure water, and further subjected to ultrasonic cleaning for 5 minutes. After the ultrasonic cleaning, the test piece was taken out, and 2 mL of a 5.3 N nitric acid aqueous solution was added into the ultrapure water after the ultrasonic cleaning to dissolve rare earth particles contained in the ultrapure water. An amount of rare earth in the collected rare earth particles was measured by ICP emission spectroscopy, and evaluated as an amount of rare earth per surface area of the sprayed coating of the test piece. In the evaluation by this test, the amount of rare earth particles is preferably up to 3 μg/cm$^2$. When the amount of the rare earth particles is more than 3 μg/cm$^2$, generation of the particles is to many, and the sprayed member may not be withstood for use in a plasma etching apparatus. The amount of rare earth particles is more preferably up to 2.5 μg/cm$^2$, and even more preferably up to 2 μg/cm$^2$.

The sprayed coating (surface layer coating) obtained in Example 7 to 12 has excellent plasma etching resistance (corrosion resistance) with reduced amount of rare earth particles generated by a reaction with corrosion halogen-based gas plasma. The generation of rare earth particles relates to the phenomenon that an aluminum halide evaporates and does not remain as particles when the surface of a sprayed coating is halogenated by halogen-based gas plasma, however, a rare earth halide generated remains as particles without evaporating. On the other hand, in terms of plasma etching resistance ability, rare earth-rich case is superior to aluminum-rich case. Further, the generation of rare earth particles relates to the fact that a rare earth-rich spraying material has few particles that cause particle contamination and form a rough coating compared with an aluminum-rich spraying material.

The spraying material obtained in Example 1 to 6 has an intensity ratio I(R)/I(RAL) of at least 1. The spraying material can suitably form a sprayed coating including a composite oxide (R$^+$AL) having a rare earth-rich composition compared to the stoichiometric composition of rare earth aluminum monoclinic ($R_4Al_2O_9$), in a rare earth oxide content of 75 to 99 wt % and an aluminum oxide content of 1 to 25 wt %, as relative contents of a rare earth oxide and an aluminum oxide ($Al_2O_3$) content. Particularly, since the value of S/ρ obtained by dividing the surface area S by the bulk density ρ is in the range of 1 to 4, the spraying material has few particles that cause particle contamination and form a rough coating. Therefore, from these results, it is recognized that rare earth particles are less generated in such a spraying material, and the spraying material has an advantage for forming a sprayed coating having excellent plasma etching resistance (corrosion resistance).

Further, in the sprayed coating (surface layer coating) obtained in Example 7 to 12, the spraying material used has an XRD diffraction peak detected at a diffraction angle that is 0.05 to 0.5° (in difference) lower than the diffraction angle attributed to the maximum XRD diffraction peak of the rare earth aluminum monoclinic ($R_4Al_2O_9$). According to existence of the peak, it has been confirmed that the sprayed coating includes a composite oxide ($R^+AL$) having a rare earth-rich composition compared to the stoichiometric composition of rare earth aluminum monoclinic ($R_4Al_2O_9$), and having a structure such that Al atom sites in the rare earth aluminum monoclinic ($R_4Al_2O_9$) are partially substituted with the rare earth (R) atoms. Further, it is recognized that by inclusion of the composite oxide ($R^+AL$) having such a rare earth-rich composition, the spraying material obtained in Example 7 to 12 has superior plasma etching resistance (corrosion resistance) with reduced amount of particles generated by a corrosive halogen-based gas plasma.

Japanese Patent Application No. 2019-076099 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A spraying material comprising a rare earth (R), aluminum (Al), and oxygen (O), the spraying material being a powder made of particles which comprise a mixed phase comprising a crystalline phase of a rare earth aluminum monoclinic ($R_4Al_2O_9$) and a crystalline phase of a rare earth oxide ($R_2O_3$);
   wherein, with respect to diffraction peaks detected within a diffraction angle 2θ range from 10° to 70° by a X-ray diffraction method using the characteristic X-ray of Cu-Kα, the spraying material has diffraction peaks attributed to the rare earth oxide ($R_2O_3$) and diffraction peaks attributed to the rare earth aluminum monoclinic ($R_4Al_2O_9$),
   and an intensity ratio I(R)/I(RAL) of an integral intensity I(R) of the maximum diffraction peak attributed to the rare earth oxide ($R_2O_3$) to an integral intensity I(RAL) of the maximum diffraction peak attributed to the rare earth aluminum monoclinic ($R_4Al_2O_9$) is at least 2;
   wherein the spraying material has a bulk density ρ of up to 2 g/cm³ and a BET specific surface area S of from 1 m²/g to 3.5 m²/g,
   and a value of S/ρ, which is obtained by dividing a numerical value of the BET specific surface area S by a numerical value of the bulk density ρ, is of 1

$$\frac{m^2/g}{cm^3/g}$$

to 4

$$\frac{m^2/g}{cm^3/g}$$

; and
   wherein the spraying material has a rare earth (R) content and an aluminum content (Al) such that, when converted to a rare earth oxide ($R_2O_3$) content and an aluminum oxide ($Al_2O_3$) content, the rare earth oxide ($R_2O_3$) content is from 75 to 99 wt. % and the aluminum oxide ($Al_2O_3$) content is from 1 to 25 wt. % with respect to a total content of the rare earth oxide ($R_2O_3$) content and the aluminum oxide ($Al_2O_3$) content.

2. The spraying material of claim 1, wherein the rare earth (R) is selected from the group consisting of yttrium (Y), gadolinium (Gd), terbium (Tb), dysprosium (Dy), holmium (Ho), erbium (Er), thulium (Tm), ytterbium (Yb), and lutetium (Lu).

3. The spraying material of claim 1 having an average particle size D50 of 1 to 50 μm.

4. A spraying slurry comprising the spraying material of claim 1, and a dispersion medium, wherein a content of the spraying material in the spraying slurry is 10 to 70 wt %.

5. The spraying slurry of claim 4, wherein the dispersion medium is an aqueous dispersion medium.

6. The spraying slurry of claim 4, further comprising a dispersing agent.

7. The spraying slurry of claim 4 having a viscosity of less than 15 mPa·s.

8. The spraying material of claim 1 wherein the bulk density ρ is an aerated bulk density.

9. The spraying material of claim 1 wherein the spraying material has a bulk density ρ of at least 0.4 g/cm³.

10. The spraying material of claim 1 having a value S/ρ of 1.5

$$\frac{m^2/g}{g/cm^3}$$

to $$\frac{m^2/g}{g/cm^3},$$

wherein the value S/ρ is obtained by dividing a numerical value of the BET specific surface area S by a numerical value of the bulk density ρ.

* * * * *